Patented Nov. 14, 1950

2,529,528

UNITED STATES PATENT OFFICE 2,529,528

MODIFICATION OF DRYING OILS

Gordon M. Williams, Glens Falls, N. Y., assignor to New Wrinkle, Inc., Dayton, Ohio, a corporation of Delaware No Drawing. Application April 23, 1947,
Serial No. 743,463

8 Claims. (Cl. 260—407)

This invention relates to siccative oils, and more particularly deals with products of a highly unsaturated nature which may be added to siccative oils or fatty acids for the purpose of improving the drying rate thereof, and the hardness and weathering and aging characteristics of the film they produce on drying, said siccative oils or fatty acids containing said additive products being characterized by the fact that when compounded with resins and driers and applied on a surface and dried thereon the resulting coating will exhibit a fine wrinkle texture of low gloss.

The additive units employed in the practice of the present invention are characterized by their unsaturation in the form of double and triple bonds and conjugated systems. Their function when used in the treatment of oils is that of a chemical reaction between the added molecule and the fatty acid radical.

The chemical union of the additive molecules to the fatty acid radical is preferably accomplished by first adding a reagent such as a halogen, halogen acids, and various other acids or similar additive reagents, to the points of unsaturation of the oil and causing appropriate condensation units to react to form C—C, ether, ester, or similar linkages between the two. However, the halogenation step may also be omitted and the chemical reaction be obtained directly by heating the organic unsaturated compound and the fatty acid radical. It will be understood that the preliminary addition reaction will serve not only to determine the number of addition units but also to a certain extent the position of particular types of additives. This then may be considered the controlling factor, and experimentation has shown that for the best siccative results, it is desirable to attack only a few of the points of unsaturation which the original oil exhibits. A too complete transformation of this type will cause cyclic compounds to attain a high degree of polymerization with the formation of resinous gums.

The condensation units are composed chemically of molecules of unsaturation or conjugation which will add to the modified fatty acid radical of the oil and still retain their degree of unsaturation. Organometallic compounds of the type R—CH=CHMg, where R represents a radical containing carbon, hydrogen, possible degrees of unsaturation, and in some cases oxygen, nitrogen, sulfur, and other inorganic ions, are suitable for the purpose. However, pure unsaturated hydrocarbons, such as for example divinylacetylene, have also been found operative. A typical reaction between the organometallic molecule and the fatty acid chain may be shown by the following idealistic reactions:

I

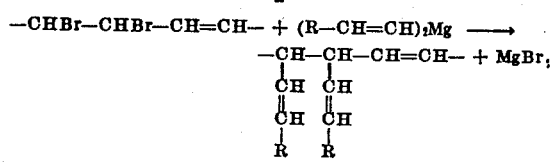

Ether and ester linkages can be shown by the following idealistic reactions:

II

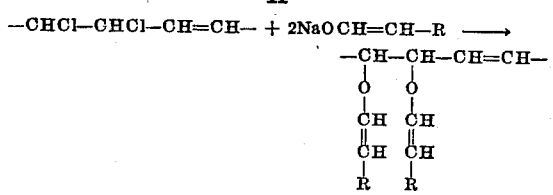

III

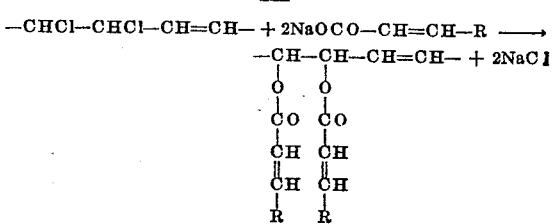

In all of the above examples the addition of two like molecules has been shown. In many cases it is desirable to use mixtures and obtain the addition of two unlike units.

The following examples are given solely by way of illustration and it is not intended that the present invention be limited to them:

Example A 100 grams of hempseed oil having an iodine value of 160 were placed in a cooking vessel and 24 grams of bromine added in the absence of strong light and with constant stirring. This amount of halogen represents approximately one-fourth of the unsaturation as calculated from the iodine value of the oil. The reaction took place immediately and 18 grams of 1-sodium-1,2-propene ($CH_3$—CH=CHNa) were added. The reactants were then heated to approximately 250° F. to insure completion of the reaction and after a period of approximately 30 minutes from the time the polymerizing agent was added the reaction was completed.

The modified oil thus obtained may be incorporated in varnish compositions including resin and driers and further processed to produce wrinkle coating compositions having the characteristics generally associated with them.

Undoubtedly a multitude of reactions occur during the heat treatment, but that which is considered the principal one from the point of view of the present invention may be illustrated by the following reaction between the condensation agent used and the linolenic acid radical which is found in hempseed oil:

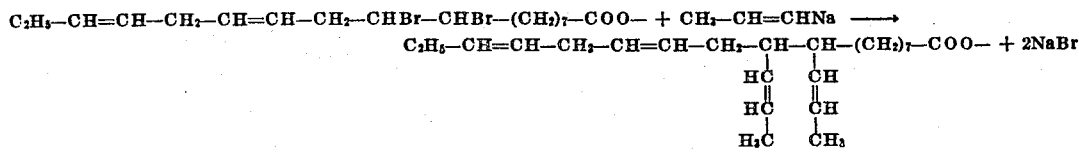

The sodium bromide which is formed in this reaction may be removed from the oil by suitable means if it is so desired but in view of the slight quantity formed, it has been found satisfactory to leave it in the oil.

*Example B*

100 grams of fish oil having an iodine value of 180 were placed in a suitable vessel and 20 grams of chlorine were bubbled through the oil while the oil was maintained under thorough agitation. The chlorine was free from water. Thereafter 53 grams of 1-sodium oxybutadiene were added and the mixture heated slowly to a temperature of 250° F. Approximately 30 minutes were consumed in attaining this temperature and at that time the reaction was considered to have been completed.

The resulting modified oil when admixed with resins and driers and cooked to a varnish produced a coating composition exhibiting the desirable characteristics of wrinkle coating compositions.

The initial reaction of the polymerizing agent with the fish oil, using the palmitoleic acid radical as an example, may be illustrated as follows:

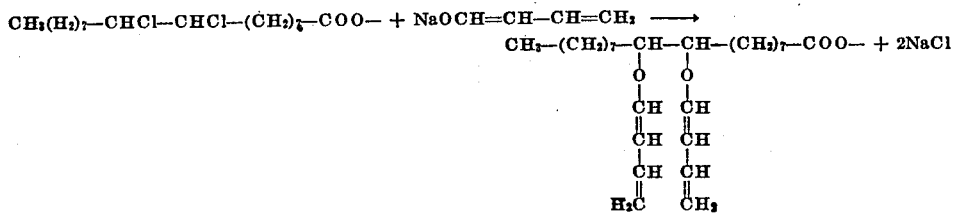

*Example C*

100 grams of linseed oil were placed in a suitable vessel and 5 grams of divinylacetylene added. The mixture was then treated at 250° F. for approximately 30 minutes, and the resulting modified oil obtained by the reaction of the oil with the divinylacetylene, when compounded with resins and driers in the usual manner, produced a varnish composition which on application and drying produced a film exhibiting all of the desirable characteristics of a wrinkle coating composition.

It will be understood that while the present invention has been described as applied to hempseed, fish and linseed oils, the same principles are applicable to ther drying and semidrying oils which according to the present invention may be transformed into faster drying oils which exhibit the physical and chemical characteristics of polyconjugated oils such as tung oil and oiticica oil. Likewise, it will be understood that while the examples given herein have made use of 1-sodium-1,2-propene, 1-sodium oxybutadiene, and divinylacetylene as additive products, other products of the same general nature may be satisfactorily used in the practice of the present invention.

It will be understood that the present invention is not intended to be limited to or circumscribed by the specific details of procedure, proportions, or materials herein described.

This application is a continuation-in-part of my abandoned co-pending application, Serial No. 485,241, filed April 30, 1943.

I claim:

1. The method of increasing the siccative properties of hempseed oil which comprises halogenating said oil to the extent of approximately 25% of its unsaturation as calculated from the iodine value, and thereafter reacting the halogenated oil with 1-sodium-1,2-propene at a temperature of 250° F. for approximately 30 minutes, whereby a condensation product is formed.

2. The method of increasing the siccative properties of hempseed oil which comprises treating said oil with bromine until its degree of unsaturation has been reduced approximately 25% as calculated from the iodine value, and thereafter reacting the halogenated oil with 1-sodium-1,2-propene at a temperature of 250° F. for approximately 30 minutes, whereby a condensation product is formed.

3. The method of increasing the siccative properties of fish oil which comprises halogenating the oil, and thereafter reacting the halogenated oil with 1-sodium oxybutadiene at a temperature of 250° F. for approximately 30 minutes, whereby a condensation product is formed.

4. The method of increasing the siccative properties of fish oil which comprises treating the oil with substantially dry chlorine, and thereafter reacting the halogenated oil with 1-sodium oxybutadiene at a temperature of 250° F. for approximately 30 minutes, whereby a condensation product is formed.

5. The method of producing a product of increased siccative properties from hempseed oil which comprises reacting 100 grams of said oil having an iodine value of 160 with 24 grams of bromine, and thereafter reacting the halogenated oil with 18 grams of 1-sodium-1,2-propene at a temperature of 250° F. for approximately 30 minutes, whereby a condensation product is formed.

6. The method of producing a product of increased siccative properties from fish oil which comprises treating 100 grams of said oil having an iodine value of 180 with 20 grams of chlorine, and thereafter reacting the halogenated oil with 53 grams of 1-sodium oxybutadiene at a temperature of 250° F. for approximately 30 minutes, whereby a condensation product is formed.

7. The method of increasing the siccative power of double bonded fatty oils and the fatty acid thereof which comprises, halogenating at least a portion of the double bonds of said fatty compounds and thereafter reacting the halogenated product with a metallo-unsaturated aliphatic compound.

8. The method of increasing the siccative power of double bonded fatty oils and the fatty acids thereof which comprises, halogenating at least a portion of the double bonds of said fatty compounds and thereafter reacting the halogenated product with an unsaturated aliphatic compound selected from the group of 1-sodium-1,2 propene, 1 sodium oxybutadiene and magnesium di propene 1.

GORDON M. WILLIAMS.

REFERENCES CITED

The following references are of record in the file of this patent:

UNITED STATES PATENTS

| Number | Name | Date |
| --- | --- | --- |
| 1,959,408 | Calcott | May 2, 1934 |
| 2,055,597 | Werntz | Sept. 29, 1936 |